United States Patent
Eastman et al.

(10) Patent No.: US 11,815,317 B2
(45) Date of Patent: Nov. 14, 2023

(54) NET SHAPE MOLDABLE THERMALLY CONDUCTIVE MATERIALS

(71) Applicant: Hamilton Sundstrand Corporation, Charlotte, NC (US)

(72) Inventors: Scott Alan Eastman, Glastonbury, CT (US); Steven W. Gronda, Feeding Hills, MA (US); Abbas A. Alahyari, Glastonbury, CT (US); Jack Leon Esformes, Jamesville, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 213 days.

(21) Appl. No.: 17/197,797

(22) Filed: Mar. 10, 2021

(65) Prior Publication Data
US 2021/0199394 A1   Jul. 1, 2021

Related U.S. Application Data

(62) Division of application No. 15/783,762, filed on Oct. 13, 2017, now Pat. No. 10,976,120.

(51) Int. Cl.
| | |
|---|---|
| *F28F 21/06* | (2006.01) |
| *B29C 43/02* | (2006.01) |
| *B29C 43/52* | (2006.01) |
| *B29D 99/00* | (2010.01) |
| *F28D 1/053* | (2006.01) |
| *F28F 1/32* | (2006.01) |
| *F28F 3/02* | (2006.01) |

(Continued)

(52) U.S. Cl.
CPC .......... *F28F 21/063* (2013.01); *B29C 43/021* (2013.01); *B29C 43/52* (2013.01); *B29D 99/0014* (2013.01); *F28D 1/053* (2013.01); *F28F 1/325* (2013.01); *F28F 3/022* (2013.01); *F28F 21/06* (2013.01); *B29K 2105/16* (2013.01); *F28F 2215/10* (2013.01); *F28F 2255/06* (2013.01); *Y10T 29/4935* (2015.01)

(58) Field of Classification Search
CPC ............................................ F28F 21/06–068
See application file for complete search history.

(56) References Cited

U.S. PATENT DOCUMENTS

| | | |
|---|---|---|
| 2,892,618 A | 6/1959 | Holm |
| 3,807,493 A | 4/1974 | Stewart |

(Continued)

FOREIGN PATENT DOCUMENTS

| | | |
|---|---|---|
| EP | 3109037 A1 | 12/2016 |
| WO | WO9966279 A2 | 12/1999 |
| WO | WO2008136912 A1 | 11/2008 |

OTHER PUBLICATIONS

Communication Pursuant to Article 94(3) EPC for EP Application No. 18199376.7, dated Sep. 18, 2020, p. 5.

(Continued)

*Primary Examiner* — Jason L Vaughan
(74) *Attorney, Agent, or Firm* — Kinney & Lange, P.A.

(57) ABSTRACT

A method of making a heat exchanger with a net shape moldable highly thermally conductive polymer composite includes mixing a polymer and a thermally conductive filler material and molding the polymer composite into heat exchanger components. The heat exchanger can be tailored to varying heating and cooling needs with moldable geometries.

12 Claims, 4 Drawing Sheets

(51) Int. Cl.
  *B29K 105/06*  (2006.01)
  *B29K 105/16*  (2006.01)

(56) References Cited

U.S. PATENT DOCUMENTS

| | | | |
|---|---|---|---|
| 4,210,774 A * | 7/1980 | Perry | H01B 3/02 |
| | | | 174/110 SR |
| 4,233,369 A * | 11/1980 | Breault | F28F 3/12 |
| | | | 429/434 |
| 4,686,135 A | 8/1987 | Obayashi et al. | |
| 4,771,826 A | 9/1988 | Grehier et al. | |
| 5,655,600 A | 8/1997 | Dewar et al. | |
| 5,829,514 A | 11/1998 | Smith et al. | |
| 5,845,399 A | 12/1998 | Dewar et al. | |
| 6,004,660 A | 12/1999 | Topolski et al. | |
| 6,397,941 B1 | 6/2002 | McCullough | |
| 6,622,786 B1 | 9/2003 | Calmidi et al. | |
| 6,835,347 B2 | 12/2004 | McCullough et al. | |
| 7,132,025 B2 * | 11/2006 | Dittmar | B29B 15/12 |
| | | | 28/107 |
| 7,272,005 B2 | 9/2007 | Campbell et al. | |
| 7,331,381 B2 | 2/2008 | Wang et al. | |
| 7,955,504 B1 | 6/2011 | Jovanovic et al. | |
| 8,299,159 B2 | 10/2012 | Chandrasekhar et al. | |
| 8,653,176 B2 * | 2/2014 | Nakamichi | C08K 3/22 |
| | | | 524/577 |
| 10,012,453 B2 * | 7/2018 | Aramaki | B29C 48/022 |
| 10,113,096 B2 * | 10/2018 | Yuan | C09K 5/14 |
| 10,704,846 B2 * | 7/2020 | Alahyari | F28F 21/081 |
| 2002/0144808 A1 * | 10/2002 | Jones | F28F 21/067 |
| | | | 165/173 |
| 2005/0042496 A1 * | 2/2005 | Bisara | H01M 8/0213 |
| | | | 264/105 |
| 2005/0274013 A1 * | 12/2005 | Aisenbrey | B29C 45/0005 |
| | | | 29/890.03 |
| 2006/0000590 A1 * | 1/2006 | Aisenbrey | H01B 1/24 |
| | | | 165/180 |
| 2007/0084593 A1 | 4/2007 | Besant et al. | |
| 2010/0043230 A1 * | 2/2010 | Bhatti | B29C 66/91935 |
| | | | 29/890.046 |
| 2011/0103021 A1 * | 5/2011 | Janssen | F21V 29/87 |
| | | | 361/717 |
| 2012/0067548 A1 * | 3/2012 | Tun | F28F 21/062 |
| | | | 264/129 |
| 2014/0262183 A1 * | 9/2014 | Zafiris | F28F 1/00 |
| | | | 165/173 |
| 2015/0027669 A1 | 1/2015 | Kokas et al. | |
| 2015/0260461 A1 | 9/2015 | Franz et al. | |
| 2016/0297935 A1 | 10/2016 | Reese et al. | |
| 2017/0115073 A1 | 4/2017 | Knox et al. | |
| 2017/0234629 A1 | 8/2017 | Schmidt et al. | |
| 2018/0356169 A1 * | 12/2018 | Alahyari | F28F 1/126 |
| 2019/0107343 A1 * | 4/2019 | Alahyari | F28F 21/063 |

OTHER PUBLICATIONS

Prior Art Publishing Gmbh, "Method for manufacturing plastic tubes for heat exchangers containing graphite fillers," Jan. 1, 2014, p. 6.
Extended European Search Report for EP Application No. 18199376.7, dated Mar. 18, 2019, p. 8.
Communication Pursuant to Article 94(3) EPC for EP Application No. 18199376.7, dated Feb. 16, 2023, 6 pages.

* cited by examiner

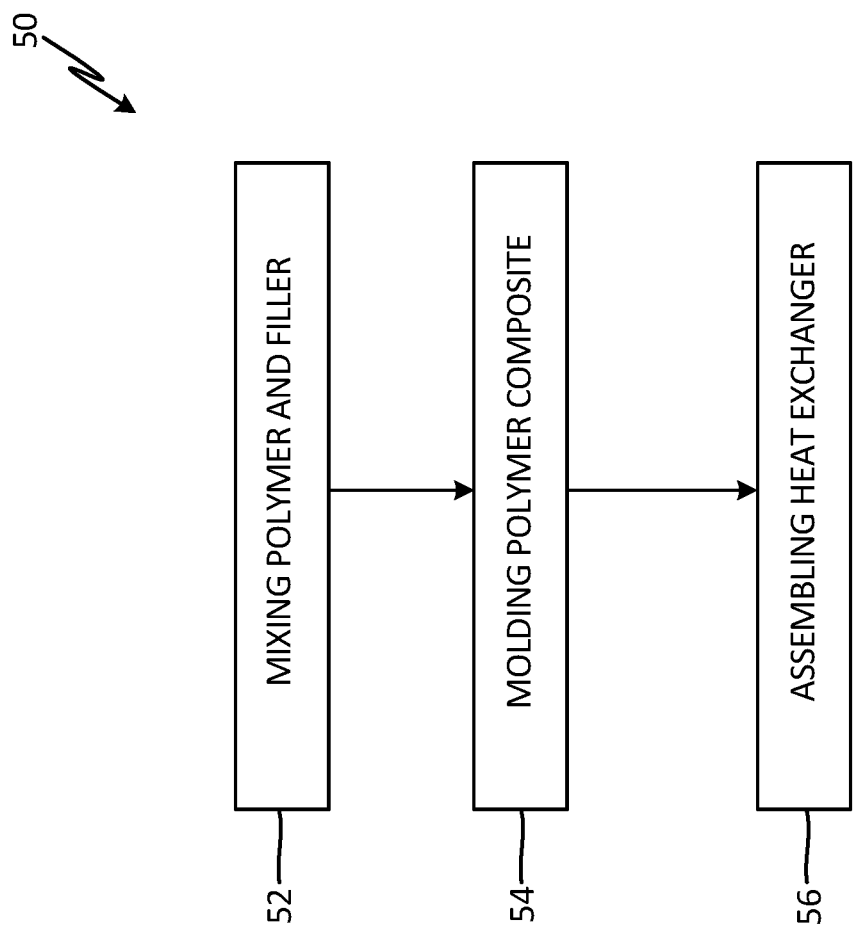

NET SHAPE MOLDABLE THERMALLY CONDUCTIVE MATERIALS

CROSS-REFERENCE TO RELATED APPLICATION(S)

This application is a divisional of U.S. application Ser. No. 15/783,762 filed Oct. 13, 2017 for "NET SHAPE MOLDABLE THERMALLY CONDUCTIVE MATERIALS" by S. A. Eastman, S. W. Gronda, A. A. Alahyari and J. L. Esformes.

BACKGROUND

This application relates generally to heat exchangers, and specifically to polymer heat exchangers.

Heating, ventilation, and air conditioning (HVAC) residential and rooftop systems typically use round tube plate fin (RTPF) or microchannel (MCHX) heat exchangers. These types of heat exchangers are not suitable for low Global Warming Potential (GWP), low pressure refrigerants, due to heat exchanger size and pressure drop constraints of these types of refrigerants. The weight associated with metallic heat exchangers is a key concern in transport and aerospace applications. Additionally, metallic heat exchanger materials can be formed into a limited number of shapes. Polymers can be used to make lighter weight heat exchangers that are suitable for GWP use. However, polymer materials typically have low thermal conductivity.

SUMMARY

A heat exchanger includes a first end plate, a plurality of middle plates attached to the first end plate, each middle plate made of a polymer composite comprising a polymer and a filler wherein the filler is between 50 percent and 95 percent by weight, and the thermal conductivity of each of the plurality of middle plates is at least 20 W/mK in one direction, and a second end plate attached to the plurality of fin layers opposite the first end plate.

A method of making a heat exchanger includes mixing a polymer and a filler material to create a polymer composite, the filler material having particles with diameters of no more than 500 micrometers, forming the polymer composite into at least one heat exchanger component, and assembling a heat exchanger from the at least one heat exchanger component.

BRIEF DESCRIPTION OF THE DRAWINGS

FIG. 3 is a flow diagram depicting a method of making a polymer composite heat exchanger.

DETAILED DESCRIPTION

Polymer heat exchangers are low weight, corrosion resistant, and have antifouling properties that make them suitable for a variety of HVAC or aerospace applications. Additionally, polymer materials are easily moldable into a variety of shapes, including thin and curved shapes that still maintain mechanical strength. However, neat polymers are not thermally conductive and are less efficient than metallic metals with regards to heat transfer. The heat transfer gap between neat polymer materials and metallic materials can be addressed by adding filler materials to polymers and allow for thin processing of polymer components for heat exchangers.

Figure 1A:
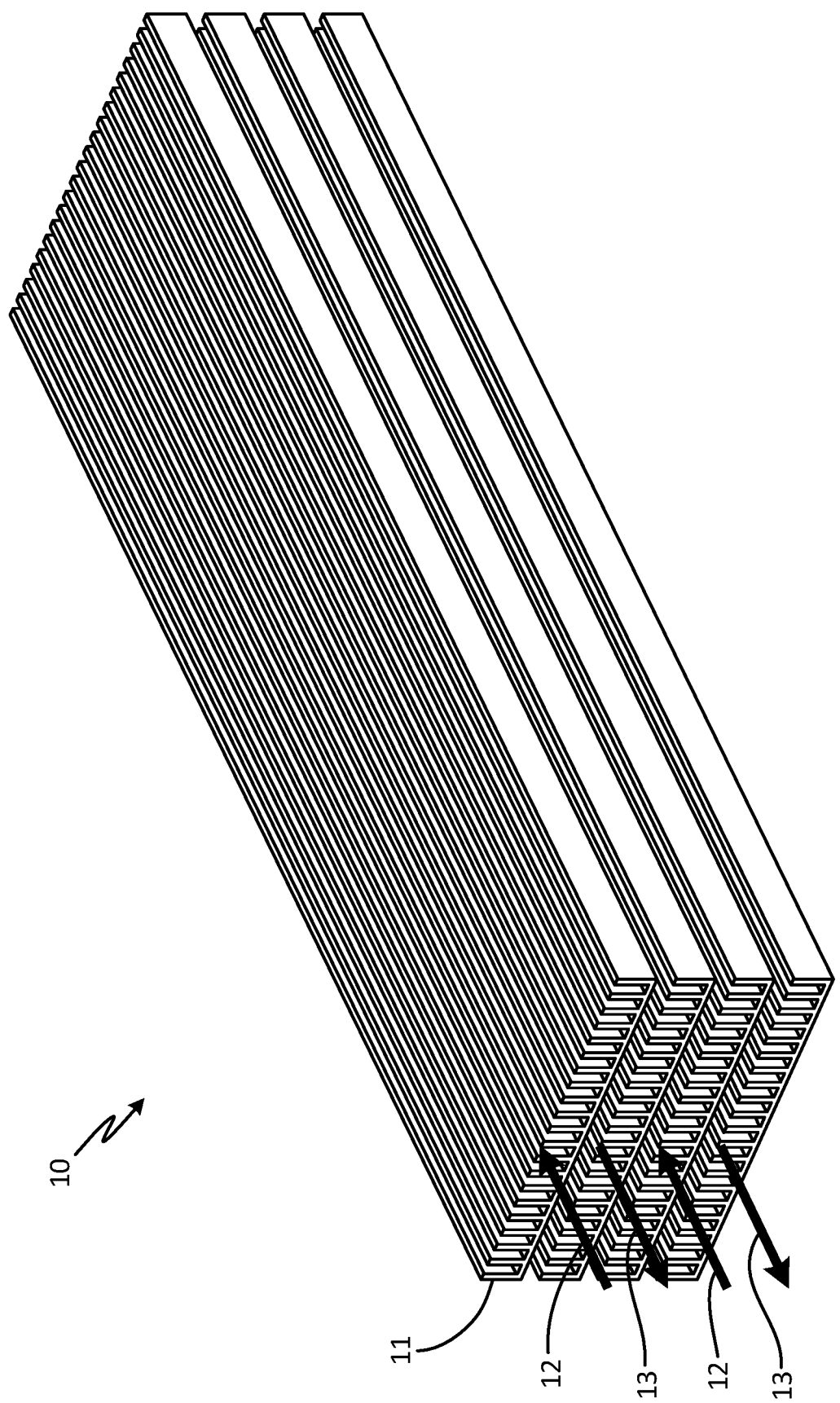
FIGS. 1A-1B are perspective views of polymer composite heat exchangers.
Figure 1B:
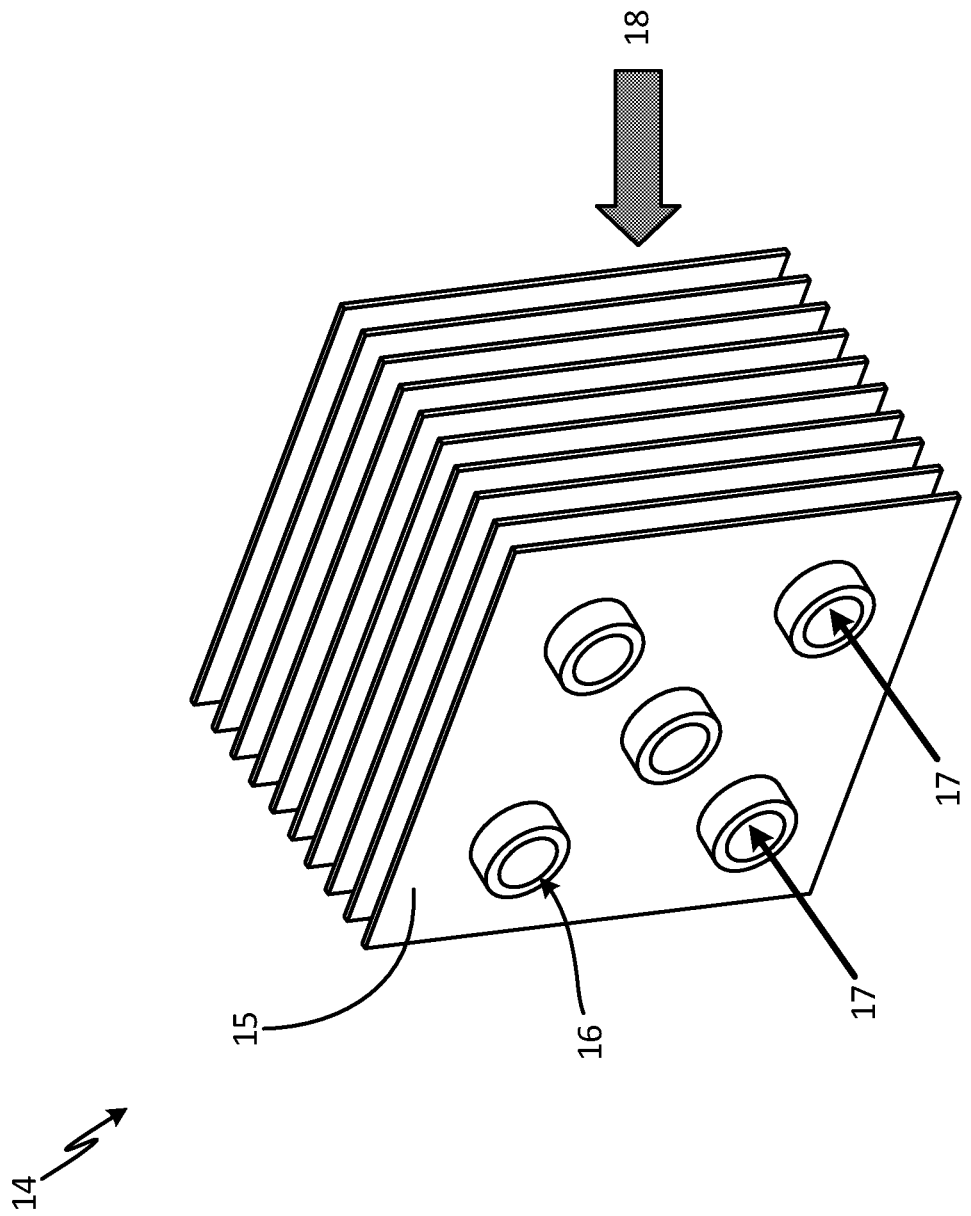

FIGS. 1A-1B are perspective views of polymer heat exchangers. FIG. 1A is a view of polymer composite heat exchanger 10. Heat exchanger 10 is a low cost, high efficiency polymer liquid-gas heat exchanger that employs a polymer composite. Heat exchanger 10 includes plates 11 stacked in parallel, and fluid streams 12 and 13. Streams 12 and 13 flow through alternating layers of plates 11 of heat exchanger 10. Plates 11 are made of the polymer composite. In heat exchanger 10, plates 11 may be separated by gaskets or bonded by epoxy or ultrasonic welding.

FIG. 1B shows heat exchanger 14 in a plate and tube configuration. Heat exchanger 14 includes plates 15 and tubes 16, in addition to fluid streams 17 and 18. In heat exchanger 14, plates may be bonded to tubes 16 by various methods such as epoxy or ultrasonic welding. Fluids from streams 17, 18, flows through plates 15 or tubes 16 and are temperature regulated as the fluid passes through heat exchanger 14. The chambers (not shown) may be integral to the plates 15. This allows for greater heat transfer efficiency between hot stream 16 and cool stream 18.

The polymer composite from which plates 11 and 15 of heat exchangers 10 and 14 are made includes both a polymer and a filler material. The polymer material can be a thermoplastic or thermoset. For instance, suitable thermoplastics include FEP (fluorinated ethylene propylene copolymer), ETFE (ethylene trifluoroetheylene) polymer, LCP (liquid crystal polymer), polyetherether keytone, polyphenylene sulfide, polyaramide (nylon), polypropylene, or other appropriate thermoplastics. Suitable thermosets can include epoxy, phenolic, bismaleimide, urethane, or other appropriate thermosets.

Fillers should be a material that increases thermal conductivity of the polymer when mixed to form polymer composite. Fillers can be, for example, graphite, graphene, boron nitride, carbon nanotubes, carbon fiber, silicon carbide, silicon nitride, metal (such as elemental copper or aluminum), or other suitable micron or nanoscale materials. Fillers can be comprised of more than one of these materials. Filler particle sizes should be less than 500 micrometers and preferably less than 200 micrometers. Ideally, filler particle size is less than 100 micrometers. While particles smaller than 10 micrometers will work, particles smaller than 10 micrometers are not preferred in order to avoid environmental health and safety as well as clean factory concerns with very small airborne particulates especially if fluidizers are used to compact powders.

Polymer composite materials made from a neat polymer mixed with a filler can have, for example, higher than 50% by weight filler material to create a polymer composite with sufficient thermal conductivity for heat exchanger applications. Preferably, the filler is greater than 60% by weight of the polymer composite, or more preferably, greater than 75% by weight of the polymer composite. The creation of the polymer composite material from the polymer and filler components is described in detail with reference to FIG. 3. The filler material can be a combination of one or more filler types with varying thermal conductivities depending on thermal conductivity needs.

Typically, a thermal conductivity of at least 20 W/m-K (both filler loading and the effective thermal conductivity of the filler) is desired. Thus, for example, of the polymer composite is only 50% filled, then the filler material must have relatively high thermal conductivity (i.e. greater than 100 W/m-K) to achieve overall composite thermal conductivities of about 20 W/m-K. However, if the polymer composite is made with 95% filler material, lower thermal conductivity filler materials can be used that have greater than 25 W/m-K thermal conductivity.

The polymer composite material of heat exchanger 10 is highly thermally conductive and net-shape moldable, in addition to being lighter weight than traditional heat exchanger materials and resistant to most aggressive chemical environments. Polymer composite materials can, for example, have 1.25 times higher through plane (20 W/m-K) and 12.5 times higher in plane thermal conductivity compared to steel (200 W/m-K) (a typical heat exchanger material). The polymer composite should have, at a minimum, a thermal conductivity of 20 W/m-K, but can have a thermal conductivity of up to or exceeding 200 W/m-K in at least one direction.

The filler material particles can be a variety of shapes, which effect the thermal conductivity of the polymer composite. If all of the filler material particles were spherical, the final polymer composite would have isotropic thermal conductivity properties and likely have conductivities toward the lower bound of 20 W/m-K. By using asymmetric filler material particles such as rod, fiber, or plate shaped particles, the thermal conductivity of the resulting polymer composite will also be asymmetric, where the highest thermal conductivity is in the direction of the filler material particle alignment. In highly aligned polymer composites, thermal conductivities can achieve and exceed 200 W/m-K in the direction of the aligned, high thermally conductive filler material particles. The polymer composite material can be molded into specific shapes depending on heating and cooling needs, as described in reference to FIGS. 2A-2F below.

FIGS. 2A-2F are perspective views of polymer composite heat exchanger plates. Each configuration in FIGS. 2A-2F shows varying geometries that can be made with a net shape moldable polymer composite material, as opposed to older, difficult to mold metallic heat exchanger materials. The selected geometry can depend on heating and cooling needs in a heat exchanger system.

FIGS. 2A-2D show heat exchanger plates with varying pin fin shapes. In each of FIGS. 2A-2D, polymer plates (20, 24, 28, 32) have an array of pin fins (22, 26, 30, 34) extending out from a top surfaces of the plate. Plate 20 exhibits circular pin fins 22, plate 24 exhibits oval pin fins 26, plate 28 exhibits teardrop shaped pin fins 30, and plate 32 exhibits seashell shaped pin fins 34. Oval, teardrop and other streamlined shapes create a smaller wake in a fluid flow path passing over the plate. This results in a favorable heat transfer to pressure drop ratio. The shapes of pin fins 22, 26, 30, 34 can alternatively be replaced by more elaborate airfoil shaped structures.

Figure 2A:
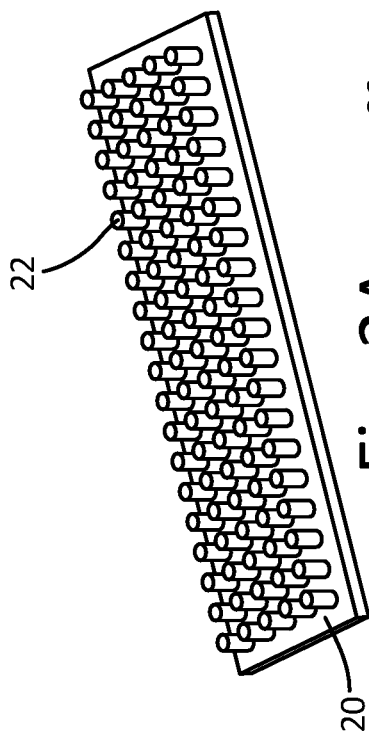
FIGS. 2A-2F are perspective views of polymer composite heat exchanger plates.
Figure 2B:
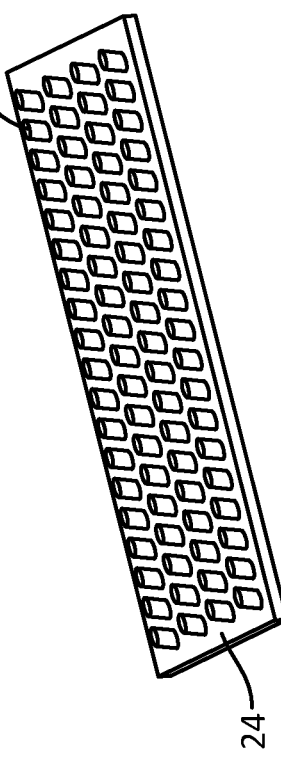
Figure 2C:
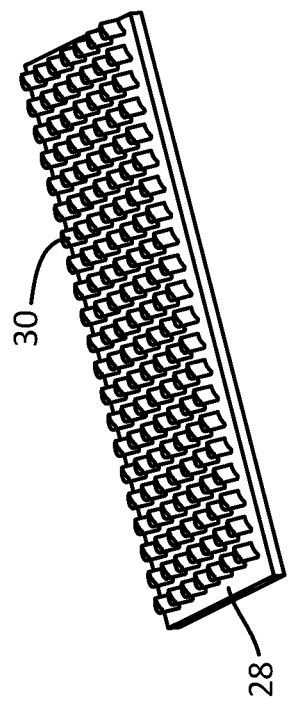
Figure 2D:
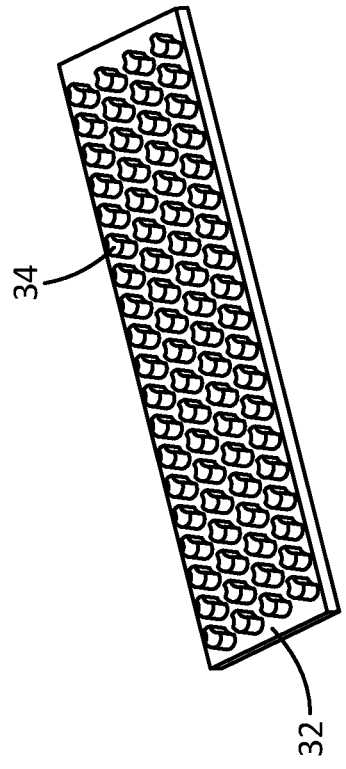
Figure 2E:
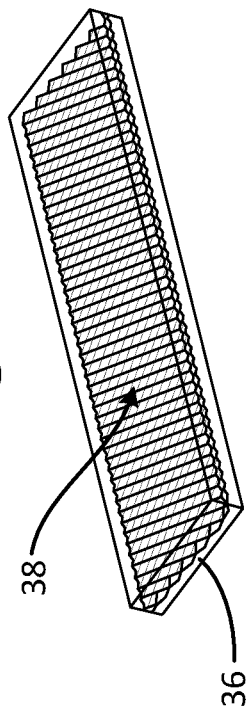

FIG. 2E shows heat exchanger plate 36 with wavy surface 38. Surface 38 is similar to the geometry and texture of metallic heat exchangers, and can results in similar fluid flow paths through the heat exchanger.

Figure 2F:
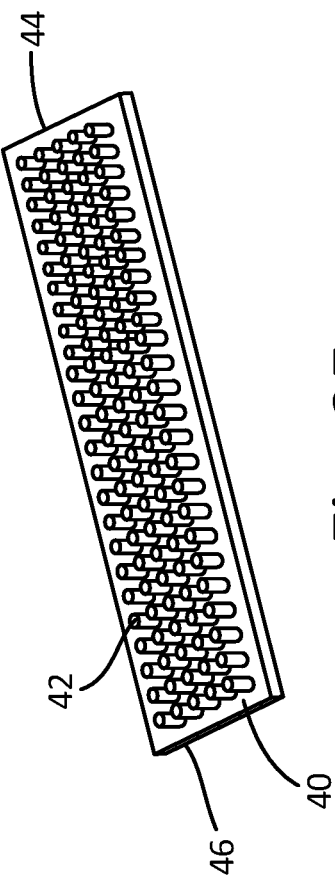

FIG. 2F shows heat exchanger plate 40 containing varying pin fins 42. Plate 40 has first end 44 and second end 46. Pin fins 42 increase in diameter across plate 40 from first end 44 to second end 46. This type of varying arrangement is appropriate for cases where there is a substantial change in fluid properties from a heat exchanger inlet to a heat exchanger outlet. In these cases, geometry of pin fins 42 can be tailored to fluid properties locally.

For instance, in condensers or evaporators where the fluid changes phase from gas to liquid (or vice-versa), tailoring the shape of pin fins 42 depending on location within the heat exchanger is appropriate. In the case of a condenser/evaporator, pin fins 42 could not only vary in diameter, but also in shape. Sparse pin fins would be appropriate in vapor regions, but denser pin fins would be appropriate in liquid regions. In this way, using a polymer composite to create heat exchanger plates with unique geometries can be tailored to heating and cooling needs. Other geometries, such as chevron patterns, or corrugated channels, can be made with the net-shape moldable polymer composite.

FIG. 3 is a flow diagram depicting method 50 of making a polymer composite heat exchanger. Method 50 includes mixing a polymer with a filler material (step 52), molding the resulting polymer composite material (step 54), and assembling the heat exchanger (step 56).

Step 52 includes mixing a polymer with a filler material to create a polymer composite material. The polymer material can be a thermoplastic or thermoset. For instance, suitable thermoplastics include FEP, ETFE polymer, LCP, polyetherether keytone, polyphenylene sulfide, polyaramide, polypropylene, or other appropriate thermoplastics. Suitable thermosets can include epoxy, phenolic, bismaleimide, urethane, or other appropriate thermosets. Fillers can be, for example, graphite, graphene, boron nitride, carbon nanotubes, carbon fiber, silicon carbide, silicon nitride, metals, combinations of these materials, or other suitable micron or nanoscale materials. More than one filler material can be used as needed. The polymer component should ideally be in powder form and roughly the same particle size or less than the filler particles to fill in the space between filler particles. This will aid in complete consolidation of the polymer and filler to form the polymer composite with minimal void or defect content.

Typically, the filler material should be at least 50% by weight of the mixture, and preferably between 60% and 95% by weight of the mixture. The polymer and filler material can be dry blended as discrete, neat material powders, or the polymer and filler can be created in a master batch such that the powder is a composite combination of the two material from early on. As an example, graphite can be used as a filler with between 60% and 95% graphite in a phenolic resin. Additionally, graphite can be used as a filler with between 60% and 95% graphite in a fluorinated ethylene propylene (FEP) polymer. In a further example, chopped carbon microfiber can be used as a filler with between 60% and 95% in a liquid crystal polymer resin.

These combinations of polymer and filler powders can be dry blended to ensure uniform mixing of the powder to then be used in the molding step. Alternatively, these powders can be consolidated into a composite by various master batch techniques and then used in the next molding step as long as the resulting master batch is powder form with characteristics described previously in paragraphs [0024]-[0025] above.

Next, in step 54, the composite polymer material is molded into desired shapes for heat exchanger parts. For example, the composite polymer material can be molded into the heat exchanger plates of FIGS. 2A-2F. In step 54, the mixed material is placed in a mold of the desired shape and can be blade leveled, or alternatively leveled by mechanical agitation or vibration. Once the molds are filled, they are pressed with heat and pressure to melt or cure the polymer and filler materials together. In another embodiment of method 50, the polymer and filler materials can be packed via fluidizer, impact and other conventional powder packing techniques in step 54 prior to while introduced to the mold to obtain the maximum powder density prior to applying heat and pressure to form the net-shape molded composite.

Alternatively, the polymer and filler materials in steps 52-54 can be printed together. In this embodiment, a bed of thermally conductive filler (for example, a powder) is sprayed with the polymer material to create a printed layer. A secondary layer can be built on the first layer in the same fashion, building up a polymer composite through a 3-dimensional powder inkjet printing method. Parts made from this method may need further post treatment, including thermal or UV exposure to cure the material. In addition, post treatments can be applied, such as improving consolidation and minimize void volume such as applying pressure and temperature to the part, or vacuum infiltrating of liquid binder for filling voids and sealing the surface. This method of 3-dimensional powder inkjet printing enables fabrication of very complex shapes that would otherwise not be possible by conventional molding techniques.

Method 50 finally include step 56, where a heat exchanger is assembled from parts made in steps 52 and 54. Steps 52 and 54 can be used to create heat exchanger plates, fins, tubes, walls, or other components. Each part of the heat exchanger can be made with desired amounts of polymer and filler to tailor the heat exchanger to particular heating and cooling needs.

The polymer composite heat exchangers are made from materials with ten times higher thermal conductivity than commercially available thermally conductive injection moldable resins. Polymer composite materials also have 1.25 times higher through plane (20 W/m-K) and 12.5 times higher in plane thermal conductivity compared to steel (200 W/m-K), a typically heat exchanger material. These polymer composite materials are net shape moldable with complex features, are chemically inert to acids, and are corrosion resistant. Finally, polymer composites can be molded to integrate surface feature for enhanced heat transfer in heat exchangers.

DISCUSSION OF POSSIBLE EMBODIMENTS

The following are non-exclusive descriptions of possible embodiments of the present invention.

A heat exchanger includes a first end plate, a plurality of middle plates attached to the first end plate, each middle plate made of a polymer composite comprising a polymer and a filler wherein the filler is between 50 percent and 95 percent by weight, and the thermal conductivity of each of the plurality of middle plates is at least 20 W/mK in one direction, and a second end plate attached to the plurality of fin layers opposite the first end plate.

The heat exchanger of the preceding paragraph can optionally include, additionally and/or alternatively, any one or more of the following features, configurations and/or additional components:

A plurality of tubes pass perpendicularly through the first end plate, the plurality of middle plates, and the second end plate.

A plurality of fin layers are sandwiched between the plurality of middle plates, the plurality of fin layers comprising the polymer composite.

The plurality of fin layers are integral to the plurality of middle plates.

Each of the plurality of plates comprises a base and a plurality of pin fins.

The pin fins are circles, ovals, tear-drop shaped, seashell shaped, or rectangles.

The pin fins vary in diameter across the plates.

The polymer of the polymer composite is a thermoplastic or a thermoset.

The polymer of the polymer composite is FEP, ETFE polymer, LCP, polyetherether keytone, polyphenylene sulfide, polyaramide, polypropylene, epoxy, phenolic, bismaleimide, urethane, or combinations thereof.

The filler of the polymer composite is graphite, graphene, boron nitride, carbon nanotubes, carbon fiber, silicon carbide, silicon nitride, a metal, or a combination thereof.

The filler contains particles with diameters of no more than 500 microns.

The filler is at least 60% by weight of the polymer composite.

The polymer contains particles with smaller diameters than the filler.

A method of making a heat exchanger includes mixing a polymer and a filler material to create a polymer composite, the filler material having particles with diameters of no more than 500 micrometers, forming the polymer composite into at least one heat exchanger component, and assembling a heat exchanger from the at least one heat exchanger component.

The method of the preceding paragraph can optionally include, additionally and/or alternatively, any one or more of the following features, configurations and/or additional components:

Mixing the polymer and the filler material comprises dry blending the polymer and the filler material or creating a master batch with the polymer and the filler material.

Forming the polymer composite comprises filling a mold and curing the polymer composite or inkjet printing the polymer and the filler material.

Filling the mold is done by blade leveling, mechanical agitation, vibration, or liquidation of the polymer composite.

The polymer composite is done by pressing the mold with heat or pressure.

Inkjet printing comprises creating a plurality of layers of the polymer composite, creating each layer comprising spraying the polymer onto a layer of the filler material.

The method includes post treating the composite polymer by applying pressure and temperature or vacuum infiltrating the polymer composite.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A method of making a heat exchanger comprising:
mixing a polymer and a filler material to create a polymer composite, the filler material having particles with diameters of no more than 500 micrometers and the polymer having particles of a size the same as or less than the particle diameter of the filler material;
forming the polymer composite into at least one heat exchanger component; and
assembling a heat exchanger from the at least one heat exchanger component.

2. The method of claim 1, wherein mixing the polymer and the filler material comprises dry blending the polymer and the filler material or creating a master batch with the polymer and the filler material.

3. The method of claim 1, wherein forming the polymer composite comprises filling a mold and curing the polymer composite.

4. The method of claim 3, wherein filling the mold is done by blade leveling, mechanical agitation, vibration, or liquidation of the polymer composite.

5. The method of claim 3, wherein curing the polymer composite is done by pressing the mold with heat or pressure.

6. The method of claim 1, further comprising post treating the composite polymer by applying pressure and temperature or vacuum infiltrating the polymer composite.

7. The method of claim 1, wherein forming the polymer composite comprises inkjet printing the polymer and the filler material.

8. The method of claim 7, wherein inkjet printing comprises creating a plurality of layers of the polymer composite, creating each layer comprising spraying the polymer onto a layer of the filler material.

9. The method of claim 1, wherein the filler material is between 50 percent and 95 percent by weight of the polymer composite.

10. The method of claim 1, wherein the heat exchange component has a thermal conductivity of at least 20 W/mK in one direction.

11. The method of claim 1, wherein the filler material is graphite, graphene, boron nitride, carbon nanotubes, carbon fiber, silicon carbide, silicon nitride, a metal, or a combination thereof.

12. The method of claim 1, wherein the polymer is a thermoplastic or a thermoset comprising fluorinated ethylene propylene (FEP) copolymer, ethylene trifluoroethylene (ETFE) polymer, liquid crystal polymer (LCP), polyetherether ketone, polyphenylene sulfide, polyaramide, polypropylene, epoxy, phenolic, bismaleimide, urethane, or combinations thereof.

* * * * *